United States Patent
Culbertson et al.

(10) Patent No.: US 11,255,244 B2
(45) Date of Patent: Feb. 22, 2022

(54) VIRTUAL SENSING SYSTEM

(71) Applicant: Watlow Electric Manufacturing Company, St. Louis, MO (US)

(72) Inventors: David P. Culbertson, Bristol, WI (US); Magdi Khair, San Antonio, TX (US); Mark Hoven, Winona, MN (US); James Pradun, Lake Geneva, WI (US)

(73) Assignee: WATLOW ELECTRIC MANUFACTURING COMPANY, St. Louis, MO (US)

( * ) Notice: Subject to any disclaimer, the term of this patent is extended or adjusted under 35 U.S.C. 154(b) by 0 days.

(21) Appl. No.: 16/260,507

(22) Filed: Jan. 29, 2019

(65) Prior Publication Data

US 2019/0155230 A1   May 23, 2019

Related U.S. Application Data (63) Continuation-in-part of application No. 15/447,942, filed on Mar. 2, 2017, now Pat. No. 10,544,722.
(Continued)

(51) Int. Cl.
  *F01N 9/00* (2006.01)
  *G05B 13/04* (2006.01)
  (Continued)

(52) U.S. Cl.
  CPC .............. *F01N 9/00* (2013.01); *F01N 3/208* (2013.01); *F01N 3/2013* (2013.01);
  (Continued)

(58) Field of Classification Search
  CPC ...... F01N 3/2013; F01N 3/2066; F01N 3/208; F01N 9/00; F01N 2240/16;
  (Continued)

(56) References Cited

U.S. PATENT DOCUMENTS

| | | | |
|---|---|---|---|
| 5,319,929 A | | 6/1994 | Cornelison et al. |
| 5,321,231 A | * | 6/1994 | Schmalzriedt ........ F01N 3/2013 |
| | | | 219/497 |

(Continued)

FOREIGN PATENT DOCUMENTS

| | | |
|---|---|---|
| CN | 1946918 | 4/2007 |
| CN | 101392673 | 3/2009 |

(Continued)

OTHER PUBLICATIONS

International Search Report for International Application PCT/US2020/015412, dated Apr. 23, 2020.

*Primary Examiner* — Hung Q Nguyen
*Assistant Examiner* — Mark L. Greene
(74) *Attorney, Agent, or Firm* — Burris Law, PLLC (57) ABSTRACT

A control system includes an electric heater disposed within an exhaust fluid flow pathway, and a control device for receiving at least one input selected from the group consisting of temperature readings along the exhaust fluid flow pathway, alternator power/current/voltage, battery power/current/voltage/state of charge, IAT and EAT profiles, mass flow rate of an exhaust fluid flow, $NH_3$ slip, TCR characteristics of the heater, alternator speed, engine speed, state of aging of an aftertreatment component, state of aging of engine, aging degradation characteristics, a dosing rate and a temperature of DEF, $NH_3$ storage condition of aftertreatment system, an ambient temperature, and combinations thereof. The control device modulates power to the heater based on the at least one input such that the heater provides different power output as a function of the at least one input and a continuously variable power output during operation of the exhaust system.

9 Claims, 5 Drawing Sheets

Related U.S. Application Data (60) Provisional application No. 62/302,482, filed on Mar. 2, 2016.

(51) Int. Cl.

| | | |
|---|---|---|
| *F02D 41/22* | (2006.01) | |
| *F01N 3/20* | (2006.01) | |
| *G07C 5/08* | (2006.01) | |
| *F02D 41/14* | (2006.01) | |
| *F02D 41/02* | (2006.01) | |
| *F02D 41/20* | (2006.01) | |
| *F02D 41/06* | (2006.01) | |

(52) U.S. Cl.
CPC ....... *F01N 3/2066* (2013.01); *F02D 41/0245* (2013.01); *F02D 41/064* (2013.01); *F02D 41/1494* (2013.01); *F02D 41/20* (2013.01); *F02D 41/22* (2013.01); *G05B 13/048* (2013.01); *G07C 5/0808* (2013.01); *F01N 2240/16* (2013.01); *F01N 2610/02* (2013.01); *F01N 2900/0602* (2013.01); *F01N 2900/08* (2013.01); *F01N 2900/104* (2013.01); *F01N 2900/1411* (2013.01); *F01N 2900/1616* (2013.01); *F01N 2900/1622* (2013.01); *F02D 2041/2027* (2013.01); *F02D 2200/0802* (2013.01); *F02D 2250/36* (2013.01)

(58) Field of Classification Search
CPC ......... F01N 2610/02; F01N 2900/0602; F01N 2900/08; F01N 2900/104; F01N 2900/1411; F01N 2900/1616; F01N 2900/1622; F02D 41/0245; F02D 41/064; F02D 41/1494; F02D 41/20; F02D 41/22; F02D 2041/2027; F02D 2200/0802; F02D 2250/36; G05B 13/048; G07C 5/0808
See application file for complete search history.

(56) References Cited

U.S. PATENT DOCUMENTS

| | | | |
|---|---|---|---|
| 5,444,976 A | 8/1995 | Gonze et al. | |
| 5,716,586 A | 2/1998 | Taniguchi | |
| 8,413,423 B2 * | 4/2013 | Roos | F01N 13/0097 |
| | | | 60/284 |
| 9,175,590 B2 | 11/2015 | Umemoto et al. | |
| 2003/0187568 A1 | 10/2003 | Yasui et al. | |
| 2008/0307774 A1 | 12/2008 | Gonze et al. | |
| 2008/0314027 A1 * | 12/2008 | Barber | B01D 53/90 |
| | | | 60/286 |
| 2009/0113883 A1 | 5/2009 | Bhatia et al. | |
| 2011/0078999 A1 * | 4/2011 | Gonze | F01N 3/2026 |
| | | | 60/286 |
| 2011/0131954 A1 * | 6/2011 | Parnin | F01N 3/027 |
| | | | 60/276 |
| 2012/0167554 A1 * | 7/2012 | Zhang | F01N 3/035 |
| | | | 60/274 |
| 2013/0239554 A1 | 9/2013 | Gonze et al. | |
| 2017/0256104 A1 | 9/2017 | Pradun et al. | |
| 2018/0094556 A1 * | 4/2018 | Kurtz | F02D 41/1446 |

FOREIGN PATENT DOCUMENTS

| | | |
|---|---|---|
| CN | 101886567 | 11/2010 |
| CN | 102105210 | 6/2011 |
| CN | 102251837 | 11/2011 |
| CN | 102105210 | 12/2013 |
| CN | 105658919 | 7/2018 |
| CN | 108625953 | 10/2018 |
| CN | 108625953 | 1/2020 |
| EP | 0456919 | 11/1991 |
| EP | 2626528 | 10/2016 |
| FR | 3057020 | 4/2018 |
| JP | H04219413 | 8/1992 |
| JP | 2003201838 | 7/2003 |
| JP | 2008019780 | 1/2008 |
| TW | 200736494 | 10/2007 |
| TW | I366625 | 6/2012 |
| WO | 2012012519 | 1/2012 |
| WO | 2012100992 | 8/2012 |

* cited by examiner

VIRTUAL SENSING SYSTEM

CROSS-REFERENCE TO RELATED APPLICATIONS

This application is a continuation-in-part application of U.S. patent application Ser. No. 15/447,942, filed Mar. 2, 2017, which claims priority to and the benefit of U.S. provisional application Ser. No. 62/302,482, filed on Mar. 2, 2016, the contents of which are incorporated herein by reference in their entirety.

FIELD

The present disclosure relates to heating and sensing systems for fluid flow applications, for example vehicle exhaust systems, such as diesel exhaust and aftertreatment systems.

BACKGROUND

The statements in this section merely provide background information related to the present disclosure and may not constitute prior art.

The use of physical sensors in transient fluid flow applications such as the exhaust system of an engine is challenging due to harsh environmental conditions such as vibration and thermal cycling. One known temperature sensor includes a mineral insulated sensor inside a thermowell that is then welded to a support bracket, which retains a tubular element. This design, unfortunately, takes a long amount of time to reach stability, and high vibration environments can result in damage to physical sensors.

Physical sensors also present some uncertainty of the actual resistive element temperature in many applications, and as a result, large safety margins are often applied in the design of heater power. Accordingly, heaters that are used with physical sensors generally provide lower watt density, which allows a lower risk of damaging the heater at the expense of greater heater size and cost (same heater power spread over more resistive element surface area).

Moreover, known technology uses an on/off control or PID control from an external sensor in a thermal control loop. External sensors have inherent delays from thermal resistances between their wires and sensor outputs. Any external sensor increases the potential for component failure modes and sets limitations of any mechanical mount to the overall system.

One application for heaters in fluid flow systems is vehicle exhausts, which are coupled to an internal combustion engine to assist in the reduction of an undesirable release of various gases and other pollutant emissions into the atmosphere. These exhaust systems typically include various aftertreatment devices, such as diesel particulate filters (DPF), a catalytic converter, selective catalytic reduction (SCR), a diesel oxidation catalyst (DOC), a lean $NO_x$ trap (LNT), an ammonia slip catalyst, or reformers, among others. The DPF, the catalytic converter, and the SCR capture carbon monoxide (CO), nitrogen oxides ($NO_x$), particulate matters (PMs), and unburned hydrocarbons (HCs) contained in the exhaust gas. The heaters may be activated periodically or at a predetermined time to increase the exhaust temperature and activate the catalysts and/or to burn the particulate matters or unburned hydrocarbons that have been captured in the exhaust system.

The heaters are generally installed in exhaust pipes or components such as containers of the exhaust system. The heaters may include a plurality of heating elements within the exhaust pipe and are typically controlled to the same target temperature to provide the same heat output. However, a temperature gradient typically occurs because of different operating conditions, such as different heat radiation from adjacent heating elements, and exhaust gas of different temperature that flows past the heating elements. For example, the downstream heating elements generally have a higher temperature than the upstream elements because the downstream heating elements are exposed to fluid having a higher temperature that has been heated by the upstream heating elements. Moreover, the middle heating elements receive more heat radiation from adjacent upstream and downstream heating elements.

The life of the heater depends on the life of the heating element that is under the harshest heating conditions and that would fail first. It is difficult to predict the life of the heater without knowing which heating element would fail first. To improve reliability of all the heating elements, the heater is typically designed to be operated with a safety factor to avoid failure of any of the heating elements. Therefore, the heating elements that are under the less harsh heating conditions are typically operated to generate a heat output that is much below their maximum available heat output.

SUMMARY

In one form, a control system for a heating system of an exhaust system is provided. The control system includes at least one electric heater disposed in an exhaust fluid flow pathway, and a control device adapted to receive at least one input. The at least one input is selected from the group consisting of temperature readings along the exhaust fluid flow pathway, alternator power, alternator current, alternator voltage, battery power, battery current, battery voltage, battery state of charge, inlet air throttle (IAT) and exhaust air throttle (EAT) profiles, exhaust gas recirculation (EGR), mass flow rate of an exhaust fluid flow, $NH_3$ slip, temperature coefficient of resistance (TCR) characteristics of the at least one electric heater, alternator speed, engine speed, state of aging of an aftertreatment component, state of aging of engine, aging degradation characteristics, a dosing rate of a diesel exhaust fluid (DEF), a temperature of the DEF, $NH_3$ storage condition of aftertreatment system, injection timing retard, cylinder cut-out, variable valve manipulation, turbocharger bypass, intake air pre-heating, late post injection, ambient temperature, ambient temperature, and combinations thereof. The control device is operable to modulate power to the at least one electric heater based on the at least one input such that a different power output is provided by the at least one heater as a function of the at least one input and such that the at least one heater provides a continuously variable power output during operation of the exhaust system.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is in no way intended to limit the present disclosure, its application, or uses. It should also be understood that steps within a method may be executed in different order without altering the principles of the present disclosure.

Figure 1:
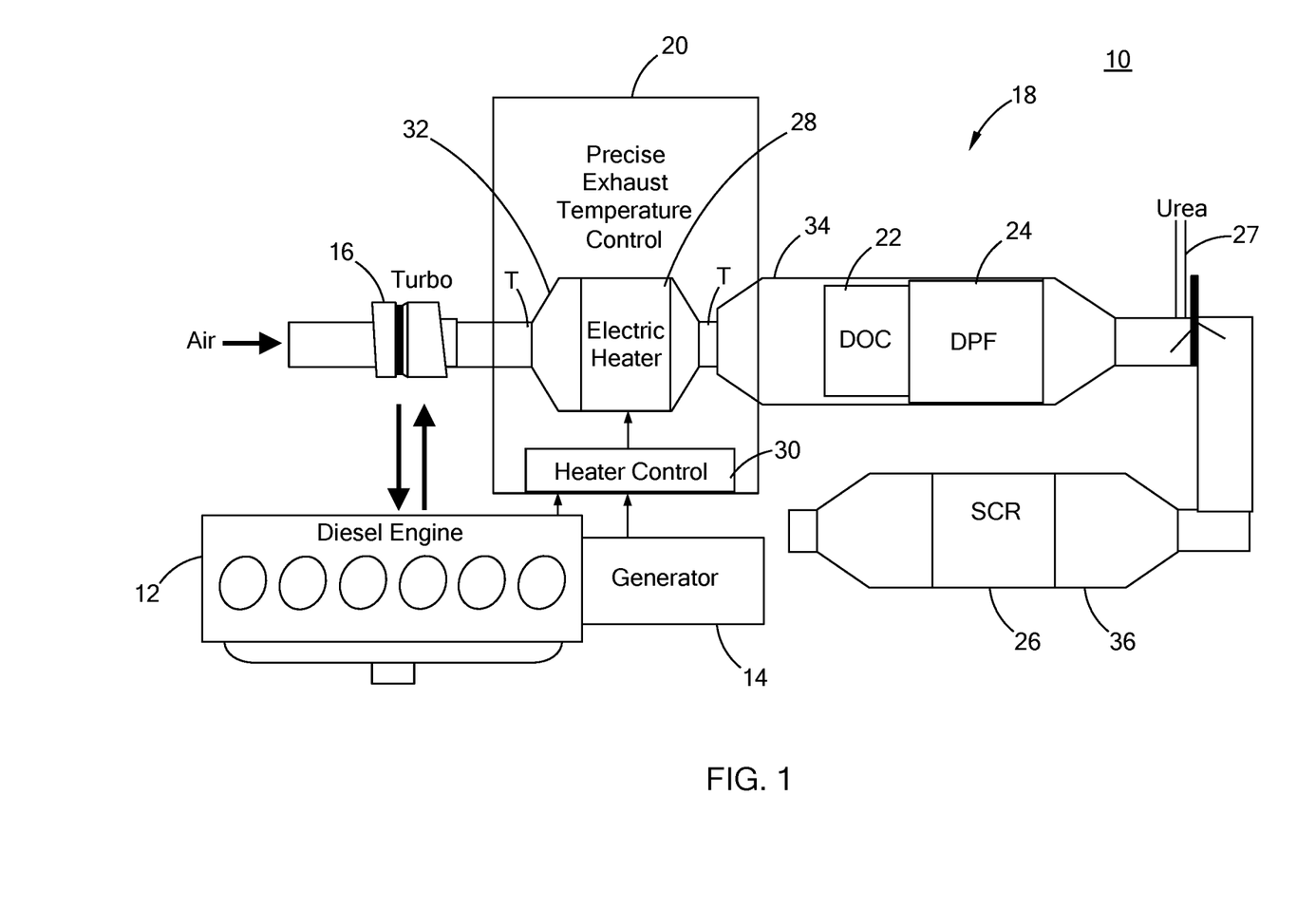
FIG. 1 is a schematic view of a diesel engine and exhaust aftertreatment system in which the principles of the present disclosure are applied.

Referring to FIG. 1, an exemplary engine system 10 generally includes a diesel engine 12, an alternator 14 (or generator in some applications), a turbocharger 16, and an exhaust aftertreatment system 18. The exhaust aftertreatment system 18 is disposed downstream from a turbocharger 16 for treating exhaust gases from the diesel engine 12 before the exhaust gases are released to atmosphere. The exhaust aftertreatment system 18 can include one or more additional components, devices, or systems operable to further treat exhaust fluid flow to achieve a desired result. In the example of FIG. 1, the exhaust aftertreatment system 18 includes a heating system 20, a diesel oxidation catalyst (DOC) 22, a diesel particulate filter device (DPF) 24, and a selective catalytic reduction device (SCR) 26. The exhaust aftertreatment system 18 includes an upstream exhaust conduit 32 that receives a heater assembly 28 therein, an intermediate exhaust conduit 34 in which the DOC 22 and DPF 24 are provided, and a downstream exhaust conduit 36 in which the SCR 26 is disposed.

It should be understood that the engine system 10 illustrated and described herein is merely exemplary, and thus other components such as a $NO_x$ adsorber or ammonia oxidation catalyst, among others, may be included, while other components such as the DOC 22, DPF 24, and SCR may not be employed. Further, although a diesel engine 12 is shown, it should be understood that the teachings of the present disclosure are also applicable to a gasoline engine and other fluid flow applications. Therefore, the diesel engine application should not be construed as limiting the scope of the present disclosure. Such variations should be construed as falling within the scope of the present disclosure.

The heating system 20 includes a heater assembly 28 disposed upstream from the DOC 22, and a heater control module 30 for controlling operation of the heater assembly 28. Heater assembly 28 can include one or more electric heaters wherein each electric heater includes at least one resistive heating element. The heater assembly 28 is disposed within an exhaust fluid flow pathway in order to heat the fluid flow during operation. Heater control module 30 typically includes a control device adapted to receive input from the heater assembly 28. Examples of controlling the operation of heater assembly 28 can include turning the heater assembly on and off, modulating power to the heater assembly 28 as a single unit and/or modulating power to separate subcomponents, such as individual or groups of resistive heating elements, if available, and combinations thereof.

In one form, the heater control module 30 includes a control device. The control device is in communication with at least one electric heater of the heater assembly 28. The control device is adapted to receive at least one input including but not limited to an exhaust fluid flow, mass velocity of an exhaust fluid flow, flow temperature upstream of the at least one electric heater, flow temperature downstream of the at least one electric heater, power input to the at least one electric heater, parameters derived from physical characteristics of the heating system, and combinations thereof. The at least one electric heater can be any heater suitable to heat an exhaust fluid. Example electric heaters include but are not limited to a band heater, a bare wire resistive heating element, a cable heater, a cartridge heater, a layered heater, a strip heater, a tubular heater, and combinations thereof. The physical characteristics may include, by way of example, resistance wire diameter, MgO (insulation) thickness, sheath thickness, conductivity, specific heat and density of the materials of construction, heat transfer coefficient, and emissivity of the heater and fluid conduit, among other geometrical and application related information.

The system of FIG. 1 includes the DOC 22 disposed downstream from the heater assembly 28. The DOC 22 serves as a catalyst to oxidize carbon monoxide and any unburnt hydrocarbons in the exhaust gas. In addition, the DOC 22 converts nitric oxide (NO) into nitrogen dioxide ($NO_2$). The DPF 24 is disposed downstream from the DOC 22 to assist in removing diesel particulate matter (PM) or soot from the exhaust gas. The SCR 26 is disposed downstream from the DPF 24 and, with the aid of a catalyst, converts nitrogen oxides (NOx) into nitrogen ($N_2$) and water. A urea water solution injector 27 is disposed downstream from the DPF 24 and upstream from the SCR 26 for injecting urea water solution into the stream of the exhaust gas. When urea water solution is used as the reductant in the SCR 26, NOx is reduced into $N_2$, $H_2O$ and $CO_2$.

In one form of the present disclosure, data from the engine system 10 described above is used in a mathematical model to predict various temperatures, including heater temperature, exhaust inlet temperature, and exhaust outlet temperature, among others, without the use of physical sensors. These models have been developed for both transient and non-transient systems and are applicable to a variety of heater types and fluid flow applications. Accordingly, the various forms provided herein of a tubular heater and an engine exhaust should not be construed as limiting the scope of the present disclosure. Further, the specific reference to a "heater sheath" temperature is merely exemplary, and the calculated temperature may be for any component of any type of heater such as a band heater, a bare wire resistive heating element, a cable heater, a cartridge heater, a layered heater, a strip heater, or a tubular heater, among others. A "layered heater" has been previously defined in U.S. Pat. No. 7,196,295, which is commonly assigned with the present application and the contents of which are incorporated herein by reference in their entirety.

Figure 2:
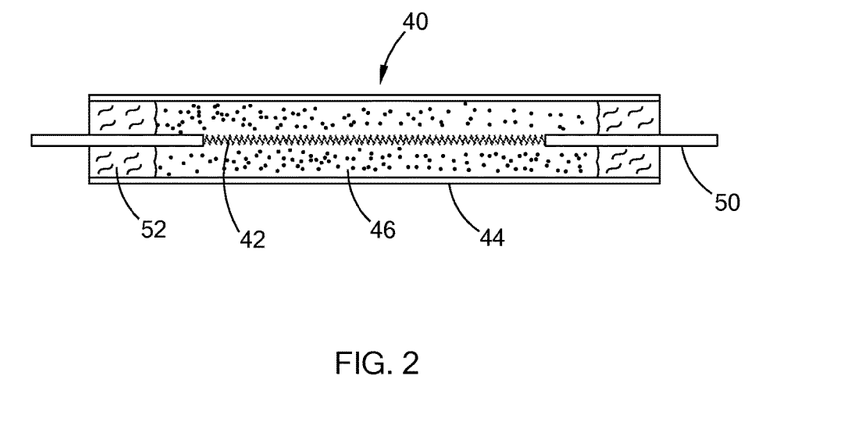
FIG. 2 is a cross-sectional view of a tubular heater construction according to the prior art.

Referring to FIG. 2, a tubular heater is used as an example type of heater used in the heater assembly 28 and is illustrated and generally indicated by reference numeral 40. The tubular heater 40 comprises a resistive heating element 42 disposed within a sheath 44, and an insulation material 46 disposed therebetween, such as by way of example, a compacted magnesium oxide (MgO). The tubular heater 40 also may include power pins 50 and seals 52.

The present disclosure provides for a control system and methods of controlling an electric heater that generally include a device/apparatus that uses inputs, such as mass flow or flow velocity, flow temperature either upstream or downstream of the heater, heater power input, and parameters derived from physical characteristics of the system, to then modulate power to the heater based on these inputs. In order to calculate values for the system depending on a set of known variables, a variety of equations are disclosed herein. It should be understood that these equations are merely exemplary and should not be construed as limiting the scope of the present disclosure.

For example, in order to calculate the temperature of the sheath 44 without the use of physical sensors in an application such as a diesel exhaust as set forth above, mass flow rate, inlet temperature, and power to the heater 40 are used, along with heat transfer equations, for a variety of heater configurations. In one form, Equation 1 below is used to calculate the temperature of the sheath 44 ($T_s$):

$$T_s = T_{out} + \frac{\left(\frac{kW}{A_s}\right)}{\frac{K}{D}\left\{C_2 \cdot C \cdot Pr^{0.36}\left(\frac{Pr}{Pr_s}\right)^{0.25}\left[\frac{D}{\mu}\left(\frac{S_T}{S_T - D}\right)\left(\frac{M_{in} + M_{fuel}}{A_c}\right)\right]^m\right\}}$$
EQUATION 1 where:
Ac=heater cross-sectional area;
As=sheath area;
C=a first constant based on Reynolds number (Re) and Table 1 shown below;
$C_2$=offset based on number of heater elements;
D=heater element diameter;
K=thermal conductivity of air;
kW=total heater power;
$M_{fuel}$=mass flow rate of fuel;
$M_{in}$=inlet mass air flow (MAF) rate;
m=a second constant based on Reynolds number (Re) and Table 1 shown below;
$P_r$=Prandtl number of air taken at gas temperature;
$Pr_s$=Prandtl number of air taken at sheath temperature;
$S_T$=transverse distance between elements;
$T_{out}$=heater outlet temperature; and
μ=viscosity of air.

TABLE 1

|  | $Re_{D, max}$ | C ("$C_1$") | m |
|---|---|---|---|
|  | 10-100 | 0.80 | 0.40 |
|  | 100-1000 | (Single cylinder approx.) | (Single cylinder approx.) |
|  | 1000-200k | 0.27 | 0.63 |
| Single Cylinder | 40-4000 | 0.683 | 0.466 |

TABLE 1-continued

| $N_L$ | 1 | 2 | 3 | 4 | 5 | 6 |
|---|---|---|---|---|---|---|
| $C_2$ | 0.70 | 0.80 | 0.86 | 0.89 | 0.90 | 0.92 |

$Re_{D,max}$=Reynolds number for a given diameter and velocity maximum;
$N_L$=Number of elements; and
$C_2$=When evaluating element 1, use $N_L$=1; when evaluating 6 elements,
$N_L$ starts at 0.7 and increases to 0.92 as each element is analyzed.

Further, in this Equation 1, radiation effects have not been incorporated, however, may be incorporated while remaining within the scope of the present disclosure.

Figure 3:
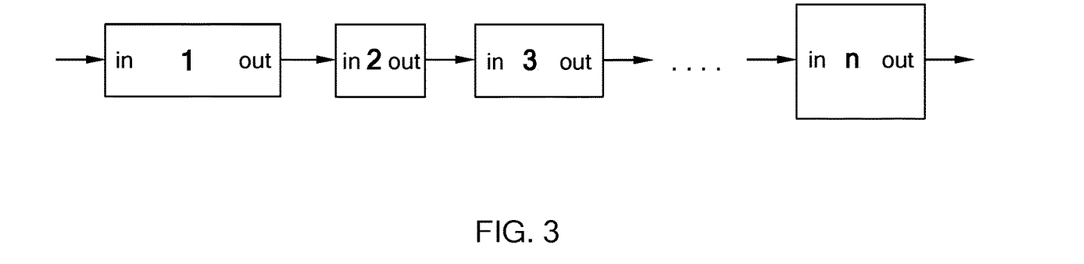
FIG. 3 is a schematic diagram illustrating a series of components in a fluid flow system according to the teachings of the present disclosure.

In addition to heater sheath 44 temperature, an outlet temperature after each element within the fluid flow stream (see FIG. 3) can be calculated/modeled, thus reducing the need for additional temperature sensors. In one form, the outlet temperature is calculated according to Equation 2 below:

$$T_{out,1} = \frac{2 \cdot \dot{m} \cdot C_P \cdot T_{in,1} + h \cdot A_s(2T_s - T_{in,1})}{2 \cdot \dot{m} \cdot C_P + h \cdot A_s}$$
EQUATION 2 where:
As=sheath surface area;
$C_p$=specific heat of air at constant pressure;
h=convective heat transfer coefficient;
$\dot{m}$=mass flow rate;
$T_{out,1}$=outlet temperature after heating element 1;
$T_{in,1}$=inlet temperature of heating element 1; and
$T_s$=sheath temperature.

Therefore, using Equation 2, temperatures can be predicted without the use of physical sensors throughout a fluid flow system. As a further advantage, using the equations as set forth herein results in a quicker response time due to the lag time associated with physical sensors, and especially in transient systems. Better accuracy and quicker response times also allows for using heaters that operate at higher temperatures, therefore providing improved performance and decreasing safety margins. Moreover, a failure mode of a physical sensor is removed by the present disclosure.

Because Equation 1 is for steady state, a further underlying equation is used for virtual sensing as disclosed herein, namely, Equation 3:

$$T_s = \frac{T_{out} + T_{in}}{2} + \frac{\left(\frac{C_P \cdot \dot{m}(T_{out} + T_{in})}{A_s}\right)}{\frac{K}{D}\left\{\begin{array}{c}C_2 \cdot C \cdot Pr^{0.36}\left(\frac{Pr}{Pr_s}\right)^{0.25} \\ \left[\frac{D}{\mu}\left(\frac{S_T}{S_T - D}\right)\left(\frac{M_{in} + M_{fuel}}{A_c}\right)\right]^m\end{array}\right\}}$$
EQUATION 3 where:
Ac=heater cross-sectional area;
As=sheath area;
C=constant based on Reynolds number (Re) and Table 1;
$C_2$=offset based on number of heater elements;
$C_p$=specific heat of air at constant pressure;
D=heater element diameter;

K=thermal conductivity of air;
$M_{fuel}$=mass flow rate of fuel;
$M_{in}$=inlet mass air flow (MAF) rate;
m=constant based on Reynolds number (Re) and Table 1;
ṁ=mass flow rate;
Pr=Prandtl number of air taken at gas temperature;
$Pr_s$=Prandtl number of air taken at sheath temperature;
$S_T$=transverse distance between elements;
$T_{in}$=heater inlet temperature;
$T_{out}$=heater outlet temperature; and
μ=viscosity of air.

Generally, so as to not be limited to the specific equations disclosed herein, $T_s$ is determined by a system of equations using inputs of set point, mass flow, and inlet temperature to calculate system temperatures.

The present disclosure further provides for predictive/proactive control of the heater 40. For example, system data such as torque demand, pedal position, and increased manifold absolute pressure (MAP)/boost/engine timing can be converted into a mass flow rate, which can then be provided to the control system to determine desired heater power in advance of when the power is needed, rather than relying on a delayed response to a physical sensor.

One variation of the present disclosure takes into account radiation effects according to Equation 4:

$$Q = \varepsilon \cdot \sigma \cdot v_f (T_h + T_{se}) \qquad \text{EQUATION 4}$$

where:
Q=radiation density;
$T_h$=absolute heater temperature;
$T_{se}$=absolute sensor temperature;
$V_f$=view factor (portion of heater radiation that strikes sensor);
ε=emissivity; and
σ=Stefan-Boltzmann constant.

Furthermore, the heater can be fully mathematically quantified such that the system frequency response of all materials comprising the heater can be determined from mass air flow (MAF) rate, heater inlet temperature, and applied power. The frequency response of the heater to changing engine and exhaust conditions or general system disruptions can be reduced, allowing the heater to have a faster feedback response. This then improves control over heater element temperature, allowing the heater to have a higher watt density (watts per unit length, watts per unit area, or watts per unit volume) and better durability, as temperature fluctuations are reduced. System representations can be simplified into a form the control microprocessor can utilize with reduced effort. Further, the present disclosure can simplify a relatively complex math process into tabulated form to reduce processing power and defined expected states. It should be understood that a variety of methods of obtaining mass air flow may be employed, such as by way of example, MAP and combining inlet air mass flow with fuel consumption. Accordingly, as used herein, the term "mass flow" shall be construed to include these and other methods of obtaining mass air flow.

Generally, the present disclosure takes inputs from a variety of devices, such as by way of example, engine, exhaust, electrical power, and heater, executes various algorithms, and then generates output such as actual power consumption, exhaust temperature, heater temperature, diagnostics, and exhaust mass flow. The engine inputs/parameters may include exhaust temperature and exhaust flow; and the heater inputs/parameters may include heater power, geometry, and coefficients. The system model may include a heater model, wire temperature and sheath temperature, and at least one control algorithm. The outputs may then include exhaust temperature, exhaust flow, and diagnostics.

In still another form, the virtual sensing system functions in a diagnostic mode to compare a response of the heater 40 to a known applied power to determine if the overall exhaust aftertreatment system 18 is degrading, has reduced efficiency, or if there is a defect in the exhaust aftertreatment system 18. In addition, the virtual sensing system may allow for the removal of a catalyst inlet temperature sensor, thus reducing the cost and complexity of the overall exhaust aftertreatment system 18. If the catalyst inlet temperature sensor remains in the exhaust aftertreatment system 18, its output can be compared to the calculated/predicted heater outlet temperature provided by the virtual sensing system and any mismatch therebetween can trigger a diagnostic trouble code within an engine control unit (ECU). Furthermore, the virtual sensor system of the present disclosure can be integrated with a model-based design (e.g., Simulink) to improve transient performance and allow better characterization of the heater system. Furthermore, a model-based design can adjust parameters/characterization of the virtual sensor system based on a specific application other than the diesel exhaust application as used herein.

The use of a virtual sensor system further reduces the uncertainty of knowing the actual resistive element (e.g., wire) temperature and allows safety margins to be reduced, increased watt density and less heater surface area, thus resulting in a more efficient and less costly heater.

The control system as disclosed herein may also control power to the heater by a calculated, or virtual temperature of the resistive heating element, such as a resistive wire. Reference is made to copending application titled "Advanced Two-Wire Heater System for Transient Systems," which has been incorporated herein by reference. In some applications such as a tubular heater, controlling by virtual wire temperature overcomes the thermal inertia of the insulation and sheath. This results in less temperature variation on the wire, which improves reliability. Such an approach also reduces the cyclic load on a power source, allowing for smoother power delivery and less strain on the power source.

The present disclosure further provides for an engine system 10 including a control system for the heating system of the exhaust system as previously described. The control device is adapted to receive engine inputs selected from the group consisting of engine parameters, exhaust parameters, electrical power output, heater parameters, and the device is operable to generate output selected from the group consisting of power consumption, exhaust temperature, heater temperature, diagnostics, exhaust mass flow rate, and combinations thereof. The control system is further operable to diagnose degrading engine system components. In this example, the control system is in communication with an engine control unit and adapted to trigger a diagnostic trouble code when a determined parameter is mismatched with a preset parameter.

Figure 4:
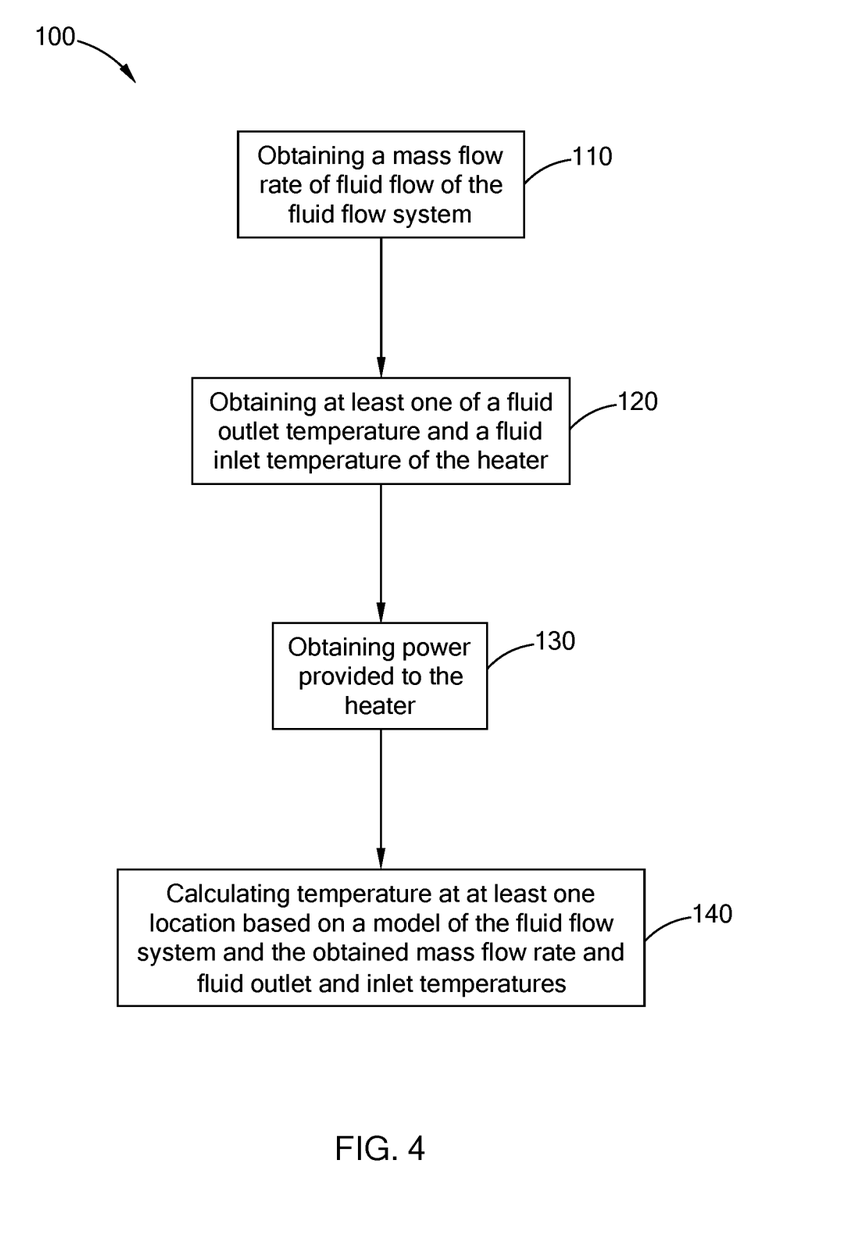
FIG. 4 is a flow diagram illustrating a method of predicting temperature of at least one location in a fluid flow system having a heater according to the teachings of the present disclosure.

Referring to FIG. 4, the present disclosure further includes a method 100 of predicting temperature of at least one location in a fluid flow system having a heater disposed in a heating system for heating fluid. The method includes obtaining a mass flow rate of fluid flow of the fluid flow system 110, obtaining at least one of a fluid outlet temperature and a fluid inlet temperature of the heater 120, obtaining power provided to the heater 130, and calculating temperature at the at least one location based on a model of the fluid flow system and the obtained mass flow rate and fluid outlet and inlet temperatures 140. The at least one location can be on a heating element of the at least one electric heater of the heating assembly. The model can include the temperature prediction models as previously described above. The process can further be integrated with a model-based design.

Figure 5:
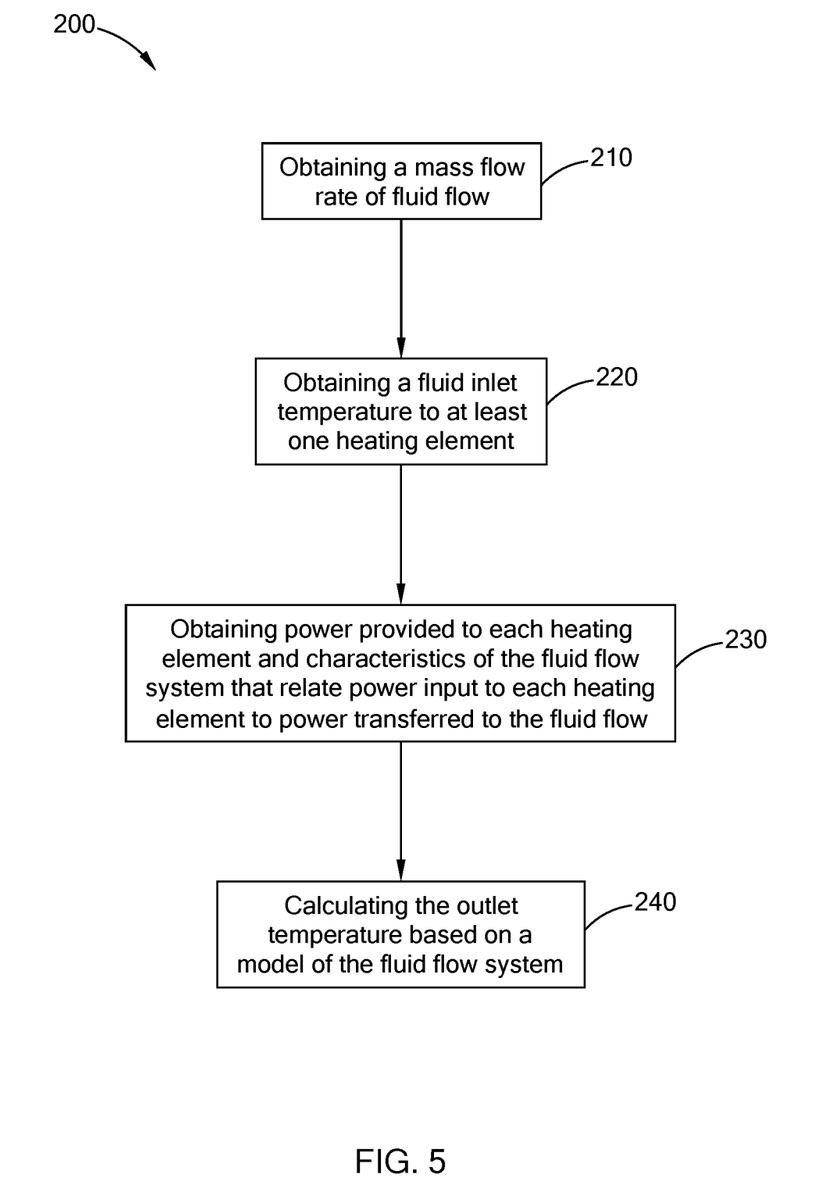
FIG. 5 is a flow diagram illustrating a method of predicting outlet temperature after each of a plurality of resistive heating elements in a heater system disposed in a fluid flow system in accordance with the teachings of the present disclosure.

Referring to FIG. 5, the present disclosure further provides another method 200 of predicting outlet temperature after each of a plurality of resistive heating elements in a heater system disposed in a fluid flow system for heating fluid. The method includes obtaining a mass flow rate of fluid flow of the fluid flow system 210, obtaining a fluid inlet temperature to at least one resistive heating element 220, obtaining power provided to each resistive heating element and characteristics of the fluid flow system that relate power input to each resistive heating element to power transferred to the fluid flow 230, and calculating the outlet temperature based on a model of the fluid flow system 240.

As used herein, the term "model" should be construed to mean an equation or set of equations, a tabulation of values representing the value of a parameter at various operating conditions, an algorithm, a computer program or a set of computer instructions, a signal conditioning device or any other device that modifies the controlled variable (e.g., power to the heater) based on predicted/projected/future conditions, wherein the prediction/projection is based on a combination of a priori and in-situ measurements.

Accordingly, a variety of different forms of heaters, sensors, control systems, and related devices and methods have been disclosed herein for use in fluid flow systems. Many of the different forms can be combined with each other and may also include additional features specific to the data, equations, and configurations as set forth herein. Such variations should be construed as falling within the scope of the present disclosure.

Figure 6:
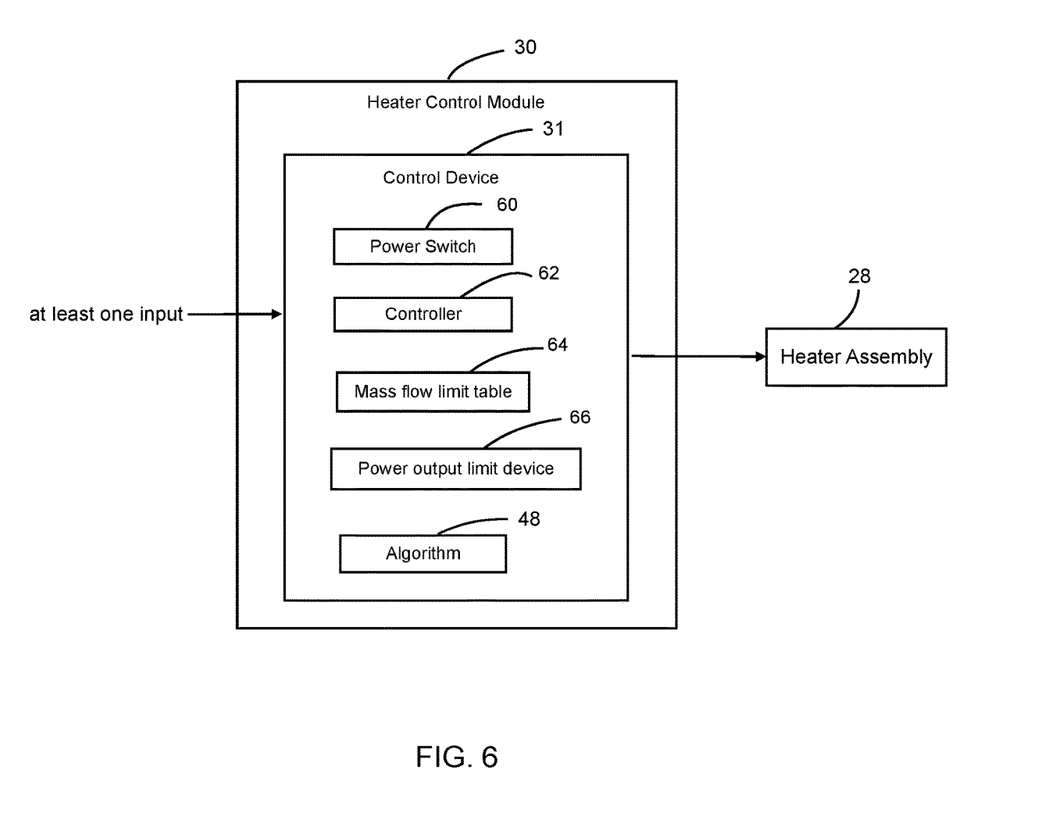
FIG. 6 is a block diagram of a heater control module constructed in accordance with the teachings of the present disclosure.

Referring to FIG. 6 in conjunction with FIG. 1, as previously noted, the heater control module 30 may be configured to control operation of the heater assembly 28 and to modulate power to the heater assembly 28. In the present embodiment, the heater control module 30 may be integrated or communicated with the engine 12 to allow for treatment of the exhaust gas in the exhaust aftertreatment system 18 without compromising the fuel efficiency or with less disturbance to the fuel efficiency.

In a prior art heating system for an exhaust system, the heater may be activated solely based on the conditions of the exhaust system, such as the temperature of the exhaust gas, without considering the conditions of the engine and the battery. Such control may compromise the fuel efficiency. For example, when the vehicle is operated in a charge-depleting or EV mode where the vehicle operation is dependent on the energy from the battery pack, actuating the heater in this state causes an increased demand for power. The increased demand for power may cause the vehicle to switch from the charge-depleting mode to an engine running mode if the battery state of charge is low, thereby undesirably increasing fuel consumption.

Therefore, the heater control module 30 of the heating system 20 for the exhaust aftertreatment system 18 may be configured to control one or more electric heaters of the heater assembly 28 in a way to reduce emissions from the exhaust aftertreatment system 18 while taking fuel efficiency into consideration. The one or more electric heaters of the heater assembly 28 are disposed in an exhaust fluid flow pathway. The heater control module 30 includes a control device 31 configured to receive at least one input relating to the conditions of the engine, the battery, the alternator, the heater, the aftertreatment component of the exhaust aftertreatment system 18, as well as the temperature along the exhaust fluid flow pathway of the exhaust aftertreatment system 18 and to modulate power to the heater assembly 28 accordingly.

When the at least one input is an engine-related condition, the engine-related condition may be represented by a predetermined or desired temperature profile. The at least one input may also relate to the conditions of the battery, the alternator, the heater, the aftertreatment component of the exhaust aftertreatment system 18. Therefore, the at least one input may be selected from the group consisting of temperature readings along the exhaust fluid flow pathway, alternator power, alternator current, alternator voltage, battery power, battery current, battery voltage, battery state of charge (SOC), inlet air throttle (IAT) and exhaust air throttle (EAT) profiles, exhaust gas recirculation (EGR), mass flow rate of an exhaust fluid flow, $NH_3$ slip, temperature coefficient of resistance (TCR) characteristics of the electric heater, alternator speed, engine speed, state of aging of an aftertreatment component, state of aging of engine, aging degradation characteristics, a dosing rate of a diesel exhaust fluid (DEF), a temperature of the DEF, $NH_3$ storage condition of aftertreatment system, injection timing retard, cylinder cut-out, variable valve manipulation, turbocharger bypass, intake air pre-heating, late post injection, ambient temperature, and combinations thereof. Based on the at least one input, the control device 31 is operable to modulate and adjust power to the heater assembly 28 continuously or at a predetermined interval. Different power/heating output is provided by the heater assembly 28 to heat the exhaust gas in the exhaust aftertreatment system 18 as a function of the at least one input.

Among the plurality of inputs, state of aging of a component refers to the time and temperature history of the component. The IAT-EAT profiles may include a temperature-mass flow profile, a temperature-engine speed profile, a temperature-load profile, or a temperature-engine condition profile. All of these profiles have different temperature targets based on engine conditions. The one or more electric heaters of the heater assembly 28 may include one or more resistive elements. The control device 31 may modulate power to the heater assembly 28 based on a calculated temperature of the resistive element(s).

As an example, when the at least one input includes the temperature readings along the exhaust fluid flow pathway, the temperature readings are relative to a threshold value to adjust or modify the output of the heater assembly 28 such that different power outputs are provided by the heater assembly 28 below and above the threshold value. In one example, the temperature readings may be an inlet temperature of a selective catalytic reduction (SCR) device 26. A higher power output is provided by the heater assembly 28 when the SCR inlet temperature is below the threshold value. A lower power output is provided by the heater assembly 28 when the SCR inlet temperature is above the threshold value. The higher power output includes an increase in magnitude and/or rate of power increase.

The control device 31 may include a power switch 60, a controller 62, a mass flow limit table 64, and a power output limit device 66. The controller 62 may be a PID controller, a predictive feedback controller, a model based controller, or any controller known in that art that can control heater power output.

When the at least one input, such as the temperature readings, is above the threshold value, the controller 62 may be used to control the heater power based on the temperature readings. However, when the temperature readings are below the threshold value and higher heater power output or a fast heating is desired, the control device 31 may bypass or override the controller 62 and the heater power is provided using a mass flow limit table 64 and a power output limit device 66. The at least one input is constantly or regularly monitored. When the at least one input has increased to reach the threshold value, the control of the heater assembly 28 may be switched to the PID control with limits. Alternatively, the control of the heater assembly 28 may be based on a predetermined algorithm 48.

Improving NOx conversion during cold exhaust conditions can achieve optimal fuel saving. Faster heating during cold exhaust conditions can improve NOx conversion when the exhaust is cold, thereby allowing the engine to be run at relatively lower temperature when the exhaust later becomes warmer to save fuel. Faster heating during cold exhaust conditions may be achieved by ramping up the power to the heater to provide more heat. Advancing fuel injection timing can also improve fuel savings. Therefore, the engine calibration may be modified to supply additional heat along with operation of the heater assembly 28 when more heat is needed.

The fuel used during cold exhaust conditions is typically a smaller portion of the overall fuel usage. By using more fuel than typically required when exhaust temperatures are low, a faster heating can be achieved, thereby achieving better NOx conversion. The better NOx conversion during cold exhaust conditions enables a reduced NOx conversion when the exhaust later becomes warmer. Therefore, the temperature for NOx conversion when the exhaust is warmer may be lowered to reduce fuel consumption. The heater power can also be minimized when the exhaust is warmer.

While extra fuel is used to achieve fast heating during cold exhaust conditions, fuel is saved during the subsequent warmer exhaust conditions when the engine will be run at a relatively lower temperature. As a result, the extra fuel that is used during cold exhaust conditions is recouped by lowering the temperature (and consequently fuel consumption) during the subsequent warming exhaust conditions. While this strategy will increase NOx emissions during the subsequent warmer exhaust conditions, the amount of NOx emissions will still be within the controlled range according to government regulations. The effect of this fuel saving strategy can be further enhanced by combining engine heating for fast heating up, such as retarded timing for fuel injection, multiple injections and injection pressure.

To reduce fuel consumption during low load operations, condition-based setpoints, instead of a single fixed setpoint, are used to more closely match a desired engine-condition-based temperature profile. In other words, the desired setpoints vary with engine conditions.

In another example, the at least one input may include battery current or battery state of charge. In this case, the heater power is limited when the battery state of charge is lower than a threshold value. Therefore, the heater assembly 28 may be controlled to be limited based on engine/alternator speed or based on change in voltage over time.

$NH_3$ slip occurs when excessive ammonia is injected in the SCR device 26 or when SCR temperature increases and $NH_3$ storage capacity is reduced. When the at least one input includes $NH_3$ slip, the heater power is lower when the $NH_3$ slip exceeds a threshold value and is higher when the $NH_3$ slips is below the threshold value.

The power switch 60 of the control device 31 may be used to control the power to the heater assembly 28. The power switch 60 may cause pulsed current/power to be supplied to the heater assembly 28. Power is pulsed to control current supply to the heater assembly 28. When the current is pulsed, voltage and average current are used to calculate the power to the heater assembly 28. By using the pulsed power along with power measurements, combined with information about exhaust mass flow, a mass flow limit table 44 or an algorithm 48 may be used to protect the heater assembly 28 and the heater assembly 28 can be made smaller.

In summary, the heater assembly 28 is controlled to provide heating to the exhaust gas in the exhaust aftertreatment system 18 taking the fuel efficiency into consideration. Therefore, the heater assembly 28 is operated in a way to provide more precise thermal control to meet emission requirements while conserving fuel through optimization. The heater assembly 28 may be controlled differently based on whether at least one input is below or above a threshold value or may be controlled differently in a plurality of heating modes. The at least one input includes parameters relating to the conditions of the engine, the conditions of the battery, the conditions of the alternator, the conditions of an aftertreatment component, and the conditions of the heater, as well as temperature of the exhaust aftertreatment system. The plurality of heating modes are also based on the conditions of the engine, the battery, the alternator, the aftertreatment component, the heater, as well as the temperature of the exhaust aftertreatment system.

The heater power is limited based on power measurement and based on duty cycle to reduce fuel consumption. By limiting the heater power, heating the exhaust gas to a single setpoint particularly during a time of generally lower engine speed and load is avoided. By limiting the heater power, switching the vehicle from an EV mode to an engine running mode (where the alternator recharges the battery) is avoided. Power limit varies with mass flow (or engine-based map). The heater assembly 28 may also be used to manage NH3 storage, thereby controlling NH3 slip. The temperature of the heater assembly 28 is controlled based on power measurement (in the context of engine, alternator, battery, etc.). Moreover, in order to conserve fuel, the temperature setpoints vary at different engine conditions. As a result, fuel can be used more efficiently while NOx emissions can be controlled within a range to meet government regulations.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A control system for a heating system of an exhaust system, the control system comprising:
    at least one electric heater disposed within an exhaust fluid flow pathway; and
    a control device configured to operate the at least one electric heater and adapted to receive at least one input, wherein the control device comprises:
        a proportional-integral-derivative (PID) controller;
        at least one of a power output limiter and a mass flow limit table,
    wherein the at least one input relates to an engine condition or a desired temperature profile, and the at least one input includes one or more temperature readings along the exhaust fluid flow pathway, alternator power, alternator current, alternator voltage, battery power, battery current, battery voltage, battery state of charge, a desired engine condition, inlet air throttle (IAT) and exhaust air throttle (EAT) profiles, exhaust gas recirculation (EGR), mass flow rate of an exhaust fluid flow, $NH_3$ slip, temperature coefficient of resistance (TCR) characteristics of the at least one electric heater, alternator speed, engine speed, state of aging of an aftertreatment component, state of aging of an engine, aging degradation characteristics, a dosing rate of a diesel exhaust fluid (DEF), a temperature of the DEF, $NH_3$ storage condition of an aftertreatment system, injection timing retard, cylinder cut-out, variable valve manipulation, turbocharger bypass, intake air pre-heating, late post injection, ambient temperature, or combinations thereof, wherein the control device is configured to control the at least one electric heater to provide a continuously variable heating output, wherein the control device is further configured to calculate a temperature, provided as a calculated temperature, based on the at least one input, wherein the control device is configured to control the at least one electric heater to provide a first power output based on the calculated temperature and the PID controller in response to the calculated temperature being greater than a calculated temperature threshold value, and wherein the control device is configured to control the at least one electric heater to provide a second power output greater than the first power output to increase heating output based on the at least one of the power output limiter and the mass flow limit table in response to the calculated temperature being less than the calculated temperature threshold value.

2. The control system according to claim 1, wherein the one or more temperature readings include a selective catalytic reduction (SCR) inlet temperature, and wherein the control device is configured to operate the at least one electric heater to provide a higher heating output when the SCR inlet temperature is below a SCR threshold value than, when the SCR inlet temperature is above the SCR threshold value.

3. The control system according to claim 2, wherein the control device is configured to provide at least one of a magnitude and a rate of power increase to the at least one electric heater to provide the higher heating output.

4. The control system according to claim 1, wherein the at least one input further includes a temperature profile based on the engine condition, including a temperature-mass flow profile, a temperature-engine speed profile, a temperature-load profile, or a temperature-engine condition profile.

5. The control system according to claim 1, wherein the at least one input includes the battery state of charge, and the control device is configured to reduce power provided to the at least one electric heater when the battery state of charge is lower than a battery threshold value.

6. The control system according to claim 1, wherein the control device is configured to pulse power to the at least one electric heater to control current supply.

7. The control system according to claim 1, wherein an engine calibration is modified to supply additional heat along with operation of the at least one electric heater when more heat is needed.

8. The control system according to claim 1, wherein the at least one input includes the $NH_3$ slip, and the control device is configured to operate the at least one electric heater to provide a lower heating output when the $NH_3$ slip is greater than an $NH_3$ threshold value than when the $NH_3$ slip is less than the $NH_3$ threshold value.

9. The control system according to claim 1, wherein
the at least one input includes the temperature reading along the exhaust fluid flow pathway,
the control device is configured to compare the temperature reading to a temperature reading threshold value, and
the control device is configured to provide power to the at least one electric heater based on the PID controller when the temperature reading is above the temperature reading threshold value and based on the at least one of the mass flow limit table and the power output limiter when the temperature reading is below the temperature reading threshold value.

\* \* \* \* \*